Feb. 11, 1936.  O. WÜNSCHE  2,030,673
POWER SYSTEM
Filed July 21, 1933
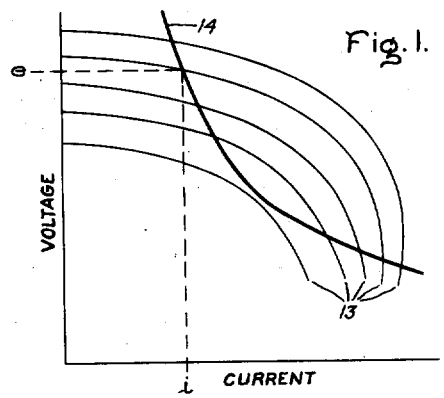
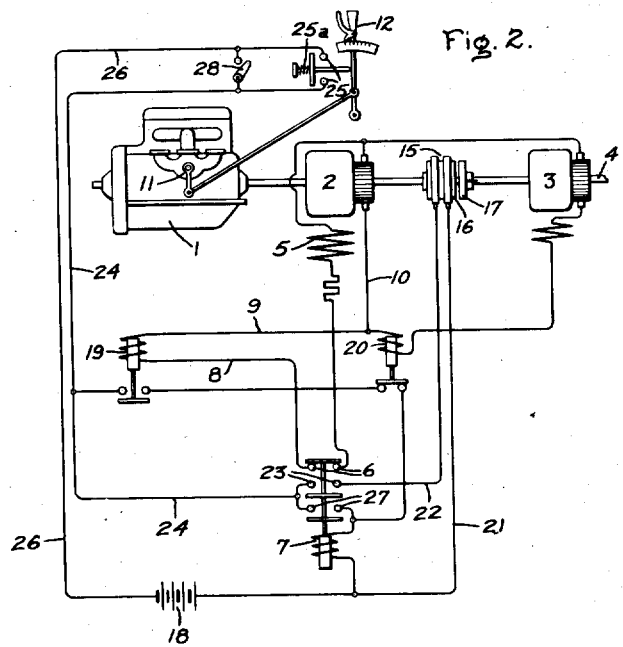
Inventor:
Otto Wünsche,
by Harry E. Dunham
His Attorney.

Patented Feb. 11, 1936

2,030,673

UNITED STATES PATENT OFFICE 2,030,673

POWER SYSTEM

Otto Wünsche, Berlin-Friedenau, Germany, assignor to General Electric Company, a corporation of New York Application July 21, 1933, Serial No. 681,619
In Germany August 3, 1932

25 Claims. (Cl. 290—17)

My invention relates to power systems in which power is transmitted from the driving to the driven member either through an electrical system or a direct power transmitting connection.

An electrical power system in which an engine drives a generator which in turn supplies current to a driving motor is satisfactory for variable speed operation, but has inherently higher losses than a system in which power is transmitted directly from the engine or other power device to the load. It is therefore desirable at the termination of the variable speed operation of the load to change from the transmission of power through the electrical system to a direct driving connection. In order to avoid undue shocks, wear of the coupling or other driving connection and to obtain smooth operation of the system, it is further desirable that the parts through which the direct driving connection is established rotate at the same speed when the connection is made.

An object of my invention is to provide an arrangement for changing from transmission of power through the electrical system to the direct driving connection which is dependent upon the generator.

Another object of my invention is to provide an arrangement in which the establishment of the direct driving connection is dependent upon the speed of the driving member and the relative speed of the driving and driven members.

Further objects and advantages of my invention will become apparent as the following description proceeds, and the features of novelty which characterize my invention will be pointed out with particularity in the claims annexed to and forming part of this specification.

In the accompanying drawing Fig. 1 shows voltage-current characteristic curves for various constant speeds of the generator employed in the system shown in Fig. 2, and Fig. 2 is a diagrammatic representation of a power system embodying my invention.

In the form of my invention illustrated in the drawing I have shown a power system including an engine 1 directly connected to a generator 2, which is electrically connected to a driving motor 3. This driving motor is connected by a shaft 4 to a load, such as the driving wheels of a vehicle. Under certain conditions of operation I provide a direct driving connection between the engine 1 and the load connected to the motor 3 and deenergize the electrical system, so as to obtain a more efficient operation of the power system.

The generator 2 of this electrical power system includes a shunt field exciting winding 5 connected across the terminals of the generator by a circuit including normally closed contacts 6 of a relay 7 and conductors 8, 9 and 10. In this way the generator 2 is self-excited, and during operation of the electrical system, current is supplied from the generator to the motor 3 to which it is electrically connected. The power output of this system is controlled by a throttle 11 of the engine which is connected by a suitable linkage to an operating lever 12.

When it is desired to obtain a direct driving connection between the engine 1 and the load connected to the shaft 4, I establish this driving connection and deenergize the electrical system in response to an electrical characteristic of the generator. In this way I establish this driving connection when the parts to be coupled together are running at the same speed, or when there is a predetermined relation between the speed of the engine and the speed of the load. The driving connection is also established by this arrangement when the generator is running at any desired speed. This produces smooth operation of the system in establishing a driving connection.

The electrical characteristics of the generator 2 are shown in Fig. 1, the curves 13 representing the voltage of the generator for different constant speeds and the curve 14 representing a power curve of the engine obtained under a particular operating condition corresponding to a particular opening of the throttle 11. From these curves it will be seen that the value of voltage $e$ and current $i$ can correspond to only one generator speed. The same value of current and voltage will also correspond to only one motor speed. It is therefore apparent that by utilizing the electrical characteristic of the generator to control the establishment of the driving connection between the engine and the load, the parts to be coupled may be caused to rotate at the same speed. By adjusting the constants of the motor and generator the speeds of the parts to be coupled can be made substantially the same for a given voltage and current conditions so that smooth operation of the system will be produced. For example, if the driving connection is established when the voltage is equal to $e$ and the current is equal to $i$ the parts to be coupled will be rotated at the same speed if the engine is operated under the condition indicated by the power curve 14. These values of $e$ and $i$ may be selected so that the direct driving connection is established between the engine and the load when the load is running at any desired speed. If the power system is employed for driving a vehicle the values of e and i will ordinarily be selected so that the direct driving connection is established at high operating speeds of the vehicle and at or near full throttle opening.

In the particular construction illustrated a direct driving connection between the engine 1 and the load connected to the shaft 4 is completed by an electrical coupling 15 including a part 16 which is directly connected to the engine 1 through the shaft of the generator 2, and an adjacent part 17 connected to the load by the shaft of the motor 3 and the shaft 4. It will be understood that the motor and generator shafts are freely rotatable with respect to each other until the magnetic coupling 15 is energized to transmit torque from the engine 1 to the load.

In order to control the energization of the electrical coupling 15 so as to establish a driving connection between the engine 1 and the shaft 4 in response to an electrical characteristic of the generator, I connect the windings of the electrical coupling carried by the part 16 to a battery 18 by a circuit including contacts of the relay 7 having an operating coil controlled by a relay 19 responsive to the generator voltage and a relay 20 responsive to the generator current. The circuit between the windings of the coupling 15 and the battery 18 include a conductor 21 connected to one side of the battery, a conductor 22, contacts 23 of the relay 7, conductor 24, contacts 25 of a switch associated with the engine throttle lever 12, and a conductor 26. The operating coil of the relay 7 may be connected across the battery 18 by a circuit including the contacts of the relay 20, contacts of the relay 19, conductor 24, contacts 25 of a switch associated with the throttle lever 12, and conductor 26. The contacts 25 of the switch associated with the throttle controlling lever are opened when the engine throttle is in the closed position shown in the drawing, and are closed when the engine throttle is open, the switch being biased toward its closed position by a spring 25ᵃ. In the position of the throttle controlling lever shown in the drawing the relay 7 is deenergized as the contacts 25 are opened. The contacts 6 of the relay 7 are therefore closed so that the shunt field exciting winding of the generator may be energized from its armature and the contacts 23 are open so that the electrical coupling 15 is deenergized. Under this condition the engine may be operating at idling speed.

When the throttle controlling lever 12 is moved to open the throttle 11 and increase the speed of the engine, the contacts 25 will be closed and permit energization of the relay 7 to deenergize the field exciting winding 5 of the generator 2 so that it will no longer supply current to the driving motor 3 and establish a circuit to energize the electrical coupling and thereby establish a driving connection directly between the engine 1 and the load connected to the shaft 4. The operating coil of the relay 7 cannot, however, be energized until the contacts of both of the relays 19 and 20 are closed. Upon operating the lever 12 to open the throttle 11 and close the contacts 25 the power system may be utilized so as to transmit power electrically from the engine 1 to the load through the generator 2 and the motor 3. The operating coil of the relay 19 is connected across the terminals of the generator 2 through the shunt field exciting winding 5 so that it is responsive to a voltage which is directly proportional to the voltage of the generator. This relay is constructed so that it will not operate to close its contacts until the voltage of the generator has increased to a predetermined maximum value approximately equal to the voltage e indicated in Fig. 1. The operating coil of the relay 20 is connected in series between the generator 2 and the motor 3 and is so constructed that it will not close its contacts until the generator current has diminished to a predetermined minimum value substantially equal to that indicated at i in Fig. 1. By this arrangement the relays 19 and 20 cooperate to control the energization of the relay 7 so that the deenergization of the generator 2 and the motor 3, and the energization of the electrical coupling 15 will not occur until the speed of the generator has attained a predetermined value, and the parts 16 and 17 of the coupling are running at the same speed. When the voltage of the generator 2 has attained the value e and the current has diminished to the value i, the contacts of the relays 19 and 20 will both be closed, so as to energize the operating coil of the relay 7 through the then closed contacts 25, associated with the throttle controlling lever. In this way the contacts 6 will be opened so as to deenergize the shunt field exciting winding 5 of the generator 2 and the motor 3, and close the contacts 23 and energize the windings of the electrical coupling 15 from the battery 18. At the same time the contacts 27 of the relay 7 will be closed so as to establish a holding circuit between its operating coil and the battery 18. The power system will then operate by transmitting power directly from the engine 1 to the load connected to the shaft 4. After the power system is operating so that power is transmitted directly from the engine to the load connected to the shaft 4 through the electrical coupling 15, the operator may wish to move the operating lever 12 toward the position shown in the drawing. The opening of contacts 25 will deenergize the electrical coupling 15, and reestablish the electrical transmission of power from the engine to the load. This may be avoided by closing the switch 28, if it is desired to continue the direct transmission of power through the electrical coupling 15 to the load.

In the operation of the power system which I have described, when the throttle lever 12 is in the position shown in the drawing, the engine is operating at idling speed and the contacts 25 are open, so that the operating coil of the relay 7 is deenergized and the contacts 6 thereof are closed. The shunt field exciting winding 5 of the generator 2 is then energized from its armature and the electrical coupling 15 is deenergized. Upon moving the throttle operating lever 12 to open the throttle 11 and increase the torque of the engine, the contacts 25 will be closed, but the relay 7 will not be energized as the voltage of the generator 2 will not be sufficient to close the contacts of the relay 19, and the contacts of the relay 20 will be opened by the current supplied from the generator 2 to the motor 3. The engine will then transmit power to the load connected to the shaft 4 through the motor and generator. The power of the engine under this condition of operation may be represented by the curve 14 in Fig. 1. It will be understood that the power curve is varied under different operating conditions. As the speed of the load connected to the shaft 4 increases the voltage of the generator 2 will increase and the current supplied by the generator will decrease, until the voltage of the generator rises to the value $e$, indicated in Fig. 1, to close the contacts of the relay 19, and until the current of the generator diminishes sufficiently to close the contacts of the relay 20. This completes a circuit between the operating coil of the relay 7 and the battery 18 through the then closed contacts 25 associated with the throttle operating lever 12. This causes the relay 7 to open its contacts 6, which deenergizes the shunt field exciting winding 5 of the generator 2 and the motor 3, and also to close the contacts 23 thereof, which simultaneously completes a circuit between the electrical coupling 15 and the battery 18. This completes the transition from the transmission of power from the engine to the load through the generator 2 and motor 3, to the establishment of the direct driving connection from the engine 1 to the shaft 4 through the electrical coupling 15. This transition takes place when the generator is operating at a predetermined speed and the motor speed bears a definite relation to the generator speed, these relative speeds being selected so that the parts 16 and 17 of the coupling are operating at the same speed. If the operating conditions of the power system up to this transition are in accordance with a different power curve from that indicated at 14 in Fig. 1, the values $e$ and $i$ at which the relays 19 and 20 are closed may be selected to obtain the transition from electrical to direct drive as above explained. It will be understood that when the engine is operated under the condition indicated by the power curve 14 indicated in Fig. 1, the system may be controlled entirely by a single voltage relay such as 19, or a single current relay such as 20, and the transition will take place at the same point as if the transition were controlled by both the voltage relay 19 and the current relay 20. In order to take care of any possible effect of changes of power on the transition from electrical to direct transmission of power, I prefer to utilize both of these relays 19 and 20. If the throttle lever 12 is moved toward its closed position as shown in the drawing, the parts will be returned to the position illustrated in the drawing and the direct driving connection between the engine 1 and the load connected to the shaft 4 will be broken. The operator may close the switch 28 and thereby retain the direct connection between the engine and the load.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is,—

1. A power system comprising a generator, means for driving said generator, a driven member, a motor connected to said driven member and electrically connected to said generator, and means responsive to an electrical characteristic of said generator for establishing a direct mechanical driving connection between said driving means and said driven member.

2. A power system comprising a generator, means for driving said generator, a driven member, a motor connected to said driven member and electrically connected to said generator, and means controlled by said generator for establishing a direct mechanical driving connection between said driving means and said driven member.

3. A power system comprising a generator, means for driving said generator, a driven member, a motor connected to said driven member and electrically connected to said generator, and means dependent upon the voltage of said generator for establishing a direct mechanical driving connection between said driving means and said driven member.

4. A power system comprising a generator, means for driving said generator, a driven member, a motor connected to said driven member and electrically connected to said generator, and means dependent upon the current of said generator for establishing a direct mechanical driving connection between said driving means and said driven member.

5. A power system comprising a generator, means for driving said generator, a driven member, a motor connected to said driven member and electrically connected to said generator, and means dependent upon the voltage and current of said generator for establishing a direct mechanical driving connection between said driving means and said driven member.

6. A power system comprising a generator having a shunt field exciting winding, means for driving said generator, a driven member, a motor connected to said driven member and electrically connected to said generator, and means including an electrically responsive element connected in series with said field exciting winding of said generator for establishing a driving connection between said driving means and said driven member.

7. A power system comprising a generator, means for driving said generator, a driven member, a motor connected to said driven member and electrically connected to said generator, and means responsive to an electrical characteristic of said generator for deenergizing said motor and for establishing a direct driving connection between said driving means and said driven member.

8. A power system comprising a generator having a field exciting winding, means for driving said generator, a driven member, a motor connected to said driven member and electrically connected to said generator, means responsive to an electrical characteristic of said generator for deenergizing said field exciting winding of said generator and for establishing a direct driving connection between said driving means and said driven member.

9. A power system comprising a generator having a shunt field exciting winding, means for driving said generator, a driven member, a motor connected to said driven member and electrically connected to said generator, and means including an electrically responsive element connected in series with said field exciting winding of said generator for establishing a direct driving connection between said driving means and said driven member and for deenergizing said field exciting winding of said generator.

10. A power system comprising a generator, means for driving said generator, a driven member, a motor connected to said driven member and electrically connected to said generator, and means responsive to an electrical characteristic of said generator for deenergizing said motor and for simultaneously establishing a direct driving connection between said driving means and said driven member.

11. A power system comprising a generator having a shunt field exciting winding, means for driving said generator, a driven member, a motor connected to said driven member and electrically connected to said generator, and means including an element connected in series with said field exciting winding of said generator for establishing a direct driving connection between said driving means and said driven member and for simultaneously deenergizing the field exciting winding of said generator.

12. A power system comprising a generator, means for driving said generator, a driven member, a motor connected to said driven member and electrically connected to said generator, and means responsive to an electrical characteristic of said generator and dependent upon a predetermined relation of the speed of said driving means to the speed of said driven member for establishing a direct mechanical driving connection between said driving means and said driven member.

13. A power system comprising a generator, means for driving said generator, a driven member, a motor connected to said driven member and electrically connected to said generator, means dependent upon the voltage of said generator and upon a predetermined relation of the speed of said driving means to the speed of said driven member for establishing a direct mechanical driving connection between said driving means and said driven member.

14. A power system comprising a generator, means for driving said generator, a driven member, a motor connected to said driven member and electrically connected to said generator, means dependent upon the current of said generator and upon a predetermined relation of the speed of said driving means to the speed of said driven member for establishing a direct mechanical driving connection between said driving means and said driven member.

15. A power system comprising a generator, means for driving said generator, a driven member, a motor connected to said driven member and electrically connected to said generator, and means dependent upon the voltage and current of said generator and upon a predetermined relation of the speed of said driving means to the speed of said driven member for establishing a direct mechanical driving connection between said driving means and said driven member.

16. A power system comprising a generator, means for driving said generator, a driven member, a motor connected to said driven member and electrically connected to said generator, and means dependent upon a predetermined maximum voltage of said generator and upon a predetermined minimum current of said generator for establishing a direct driving connection between said driving means and said driven member.

17. A power system comprising a generator, means for driving said generator, a driven member, a motor connected to said driven member, and means dependent upon a predetermined relation of the speed of said driving means to the speed of said driven member and dependent upon a predetermined speed of said driving means for establishing a direct driving connection between said driving means and said driven member.

18. A power system comprising a generator, means for driving said generator, a driven member, a motor connected to said driven member, and means responsive to an electrical characteristic of said generator and dependent upon a predetermined relation of the speed of said driving means to the speed of said driven member and dependent upon a predetermined speed of said driving means for establishing a direct mechanical driving connection between said driving means and said driven member.

19. A power system comprising a generator, means for driving said generator, a driven member, a motor connected to said driven member and electrically connected to said generator, and means dependent upon the voltage of said generator and upon a predetermined relation of the speed of said driving means to the speed of said driven member and dependent upon a predetermined speed of said driving means for establishing a direct driving connection between said driving means and said driven member.

20. A power system comprising a generator, means for driving said generator, a driven member, a motor connected to said driven member and electrically connected to said generator, and means dependent upon the current of said generator and upon a predetermined relation of the speed of said driving means to the speed of said driven member and dependent upon a predetermined speed of said driving means for establishing a direct driving connection between said driving means and said driven member.

21. A power system comprising a generator, means for driving said generator, means movable from an idling position for controlling the operation of said driving means, a driven member, a motor connected to said driven member and electrically connected to said generator, means for establishing a direct driving connection between said driving means and said driven member, and means dependent upon said control means being in the idling position for preventing the establishing of said direct driving connection.

22. A power system comprising a generator, an engine for driving said generator, means movable from an idling position for controlling the supply of motive fluid to said engine, a driven member, a motor connected to said driven member and electrically connected to said generator, means for establishing a direct driving connection between said engine and said driven member, and means dependent upon said motive fluid control means being in the idling position for preventing the establishing of said direct driving connection.

23. A power system comprising a generator, an engine for driving said generator, means movable from an idling position for controlling the supply of motive fluid to said engine, a driven member, a motor connected to said driven member and electrically connected to said generator, means for establishing a direct driving connection between said engine and said driven member, means dependent upon said motive fluid control means being in the idling position for preventing the establishing of said direct driving connection, and means for rendering said control means ineffective to control the driving connection between said engine and said driven member.

24. A power system comprising a generator, means for driving said generator, means movable from an idling position for controlling the operation of said driving means, a driven member, a motor connected to said driven member and electrically connected to said generator, means responsive to an electrical characteristic of said generator and dependent upon said control means being moved from the idling position for deenergizing said motor and for establishing a direct driving connection between said driving means and said driven member.

25. A power system comprising a generator having a shunt field exciting winding, means for driving said generator, means movable from an idling position for controlling the operation of said driving means, a driven member, a motor connected to said driven member and electrically connected to said generator, and means including an element connected in series with said field exciting winding of said generator and dependent upon said control means being moved from the idling position for establishing a direct driving connection between said driving means and said driven member and for simultaneously deenergizing the field exciting winding of said generator.

OTTO WÜNSCHE.